United States Patent [19]

Zahid

[11] 4,099,545
[45] Jul. 11, 1978

[54] LARGE PORT PRESSURE ACCUMULATOR

[75] Inventor: Abduz Zahid, Los Angeles, Calif.

[73] Assignee: Greer Hydraulics, Inc., Los Angeles, Calif.

[21] Appl. No.: 688,102

[22] Filed: May 19, 1976

[51] Int. Cl.² ........................... F16L 55/04
[52] U.S. Cl. .................................. 138/30
[58] Field of Search ............ 138/30; 251/359, 360, 251/363

[56] References Cited

U.S. PATENT DOCUMENTS

| | | | |
|---|---|---|---|
| Re. 17,022 | 7/1928 | Wilson | 251/359 X |
| 2,492,014 | 12/1949 | Spalding et al. | 138/30 X |
| 2,947,326 | 8/1960 | Mercier | 138/30 |
| 2,985,424 | 5/1961 | Anderson et al. | 251/360 X |
| 3,066,700 | 12/1962 | Mercier | 138/30 |
| 3,138,176 | 6/1964 | Mercier | 138/30 |
| 3,379,215 | 4/1968 | Greer et al. | 138/30 |
| 3,433,268 | 3/1969 | Greer | 138/30 |
| 3,500,866 | 3/1970 | Greer | 138/30 |
| 3,695,298 | 10/1972 | Zahid | 138/30 |
| 3,948,287 | 4/1976 | Sugimura et al. | 138/30 |

Primary Examiner—Richard E. Aegerter
Assistant Examiner—James E. Bryant, III
Attorney, Agent, or Firm—Arthur B. Colvin

[57] ABSTRACT

In accordance with the present invention, there is disclosed an improved large port pressure accumulator-pulsation dampener especially intended for use in applications where the liquid components may incorporate entrained abrasive materials. The device is characterized by an improved liquid port valve assembly which provides long life characteristics notwithstanding exposure to the abrasive substances, and further assures against extrusion of the bladder assembly through the liquid port and damage to the bladder.

2 Claims, 2 Drawing Figures

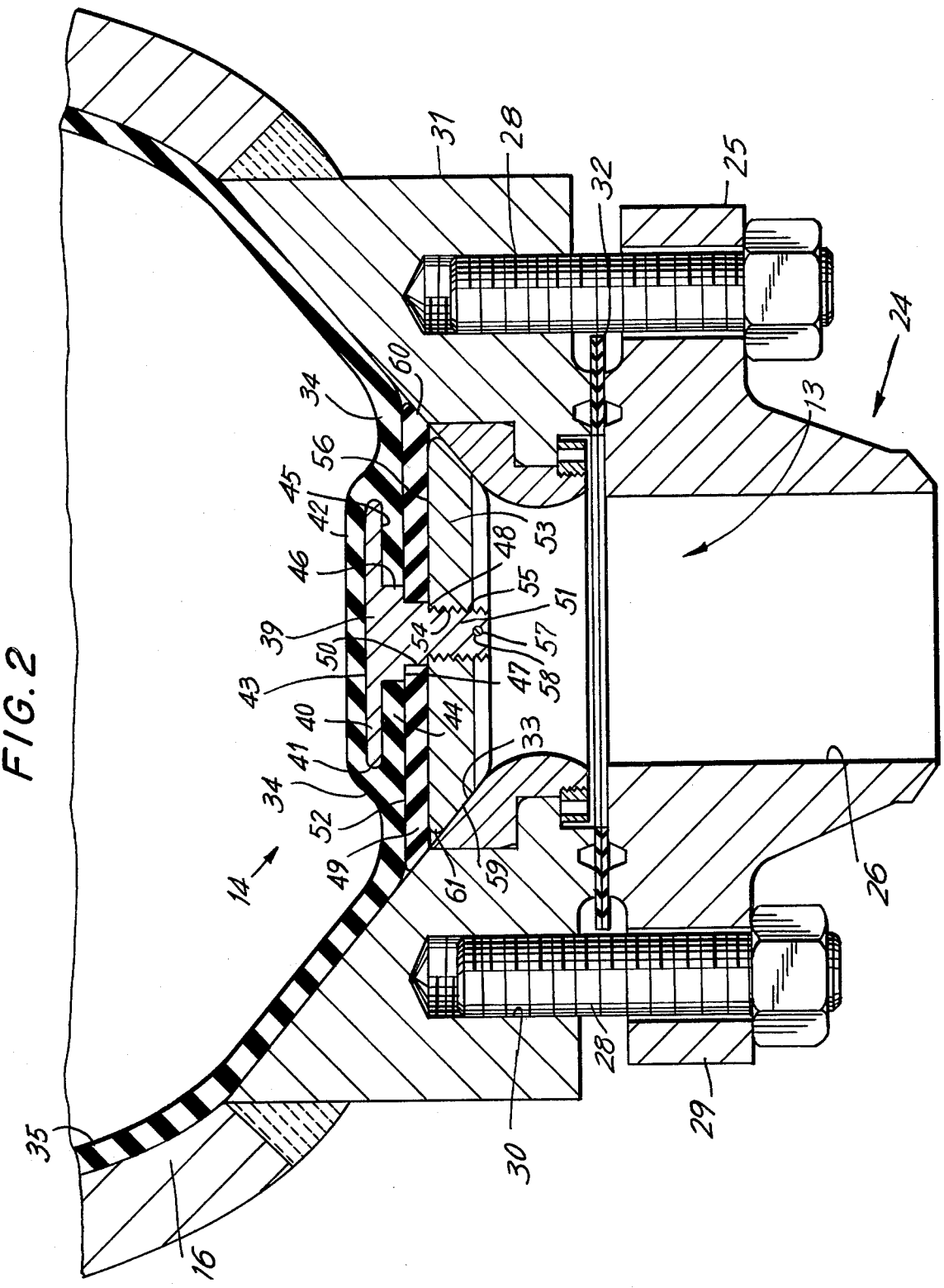

LARGE PORT PRESSURE ACCUMULATOR

This invention is in the field of pressure accumulators and, more particularly, hydraulic pressure accumulators also used as pulsation dampeners in the pumping of mud, water having entrained coal particles, etc.

In applications of the type described wherein the liquid to be pumped may incorporate entrained abrasive material, the incidence of failure of the bladder and/or the moving valve components has been found to be particularly high. Efforts have been made to reduce the incidence of failure through abrasion and/or extrusion of the bladder component by guiding the poppet. However, mechanical guide means have been only partially successful in view of the presence of particulate matter at the interface of the moving components, resulting in occasional jamming and rapid wear of the mechanism.

Upon rapid flow of fluid through the valve into or out of a bladder type pressure vessel, such as a pressure accumulator, violent lateral vibration of the bladder may occur, with substantial resultant distortion of the bladder. If such occurrence should coincide with a rapid pressure drop in the liquid chamber, the bladder may, due to its distorted condition, be sandwiched between the poppet or valve and the valve seat, with resultant damage to, or destruction of, the bladder.

The present invention may be summarized as directed to an improved accumulator having an advanced valve assembly which is capable of providing a complete seal at the fluid port end of the accumulator and, in addition, has improved wear characteristics and resistance to extrusion of the bladder.

The invention is directed to an accumulator of the type described wherein mechanical guiding of the valve components is not required.

Accordingly, it is an object of the invention to provide an improved pressure accumulator, particularly of the large liquid port type especially adapted for use as a pulsation dampener, in environments where liquids having entrained abrasive material may be encountered.

A further object of the invention is the provision of an accumulator of the type described having an improved valve assembly.

Still a further object of the invention is the provision of an accumulator of the type described wherein the valve assembly includes a plug member, preferably insert-molded into the closed end of the bladder, a rigid centering member carried at the lowermost end of the plug, which functions, by virtue of a beveled lower edge portion, to coact with a complementally beveled portion of the valve seat and center the bladder as respects the liquid port, the plug carrying, in sandwiched relation between the bladder and centering member, a sealing disk or insert of resilient elastomeric material which is of higher stiffness or durometer than that of the bladder. The disk projects radially beyond the centering member, the projecting lip or extension of the disk functioning to prevent extrusion of the bladder or contact of the bladder with the centering member, such extending portion also being pressed by adjacent portions of the bladder into contact with portions of the valve seat to define and/or augment the seal at the liquid port.

According to the invention, these objects are accomplished by the arrangement and combination of elements hereinafter described and more particularly recited in the claims.

In the accompanying drawings wherein is shown an embodiment incorporating the several features of the invention:

FIG. 2 is a magnified vertical section of the valve components of said accumulator in the sealed position thereof.

Figure 1:
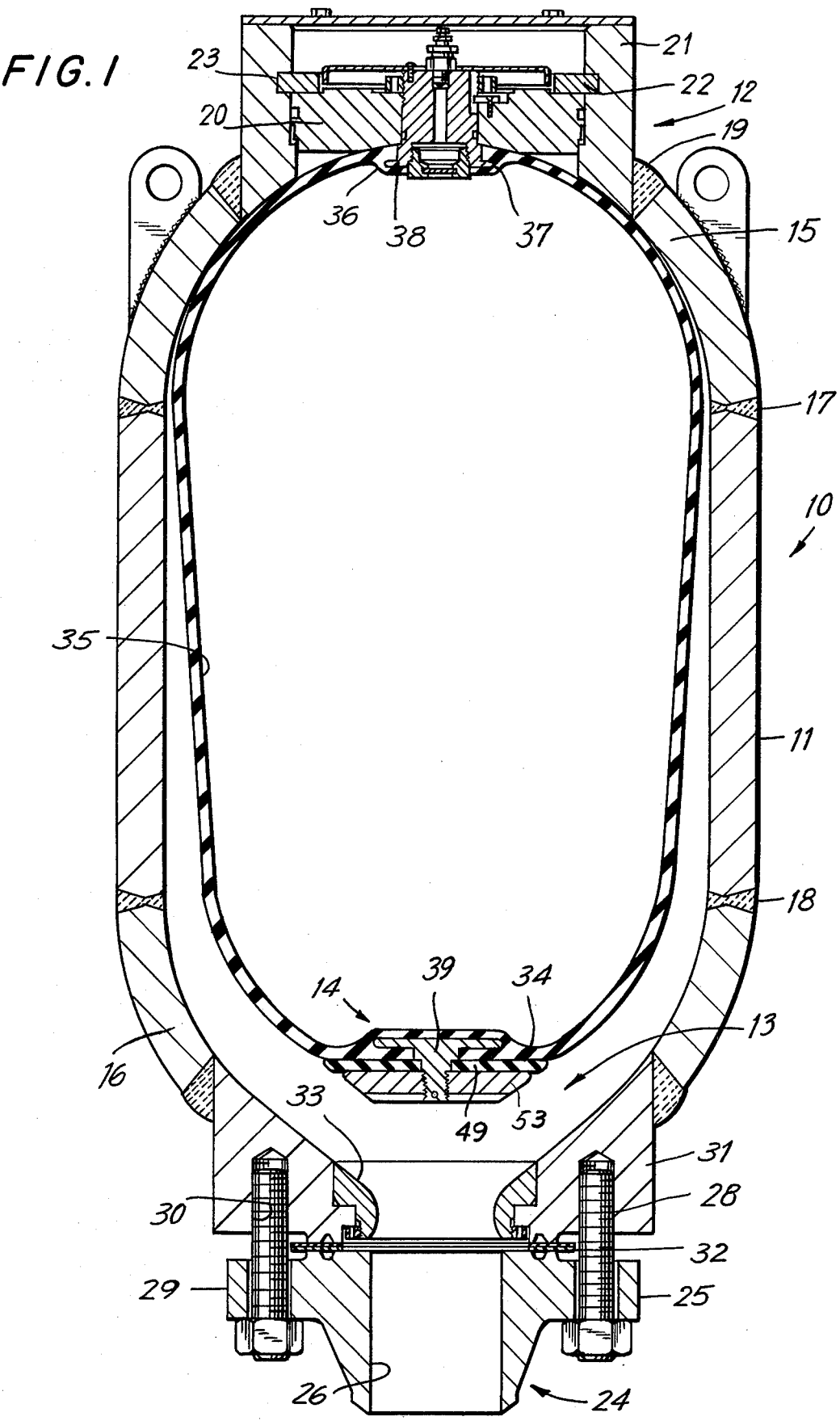
FIG. 1 is a vertical sectional view of an accumulator in accordance with the invention.

Referring now to the drawings, there is shown in FIG. 1 a vertical section through an accumulator device 10 in accordance with the invention, the device generally including a casing 11, a gas charging valve or port assembly 12 at the upper end, and a liquid port 13 at the lower end.

As the principal advance of the instant invention is directed to the valve assembly 14, the remaining elements of the accumulator will be only briefly described by way of background information.

As is typical, the casing, which in the illustrated embodiment is generally cylindrical in section, has upper and lower hemispheric end portions 15, 16, respectively. The casing may be made in sections which are welded together along annular weld lines 17 and 18. The gas charging valve assembly 12 may be weldingly connected at 19 to the upper end of the upper section 15.

In the present embodiment, and without limitation, the gas charging valve assembly may include a removable valve insert 20, held in position in a cylindrical neck portion 21 by a split ring washer 22 riding in an annular groove 23. It will be understood that the described mechanism affords the ability of removing the bladder assembly and replacing the same by demounting components of the gas charging valve assembly 12.

The accumulator is supported by a mounting fixture 24 including a collar 25 made fast to the main liquid conduit (not shown), an opening 26 in the fixture communicating fluids in the conduit to the liquid inlet port 13. A plurality of bolts 28, extending through a flange 29 in the fixture, are connected into complementally threaded bores 30 formed in the base 31 of the accumulator. Appropriate gasketting material 32 may be clamped between the opposed faces of the accumulator and fixture to assure against leakage at this junction.

The liquid port 13 includes and is defined by an annular beveled seat 33 of an essentially inverted frustoconic configuration. It will be understood that the seal at the liquid portion 13 is effected when the valve assembly 14 is pressed into the seat 33 by virtue of the pressure in the gas chamber exceeding the pressure in the liquid chamber by a predetermined amount.

The valve assembly 14 is carried at the lower or closed end 34 of the bladder assembly 35. The bladder assembly 35 includes an open end portion 36 having an annular recess 37, bonded to a retainer flange 38 forming a part of the gas charging valve assembly. The upper or open end of the bladder assembly 35 may be mounted in many other ways to afford the desired sealed connection of said end and the interior walls of the casing 11.

The bladder 35 is made of a tough, stretchable, resilient elastomeric material, such as synthetic rubber, which is resistant to the liquid to which it will be exposed. It will be understood that the bladder 35 divides the interior of the accumulator into two chambers, respectively an upper chamber in communication with the gas charging valve 12, and a lower chamber in communication with the liquid inlet port 13. The bladder assembly carries the valve assembly 14 at its lower end.

The valve assembly may include a mounting plug 39 formed of metal or like rigid and durable material, the plug 39 preferably insert-molded in situ or bonded into a suitably formed recess in the lower end 34 of the bladder 35.

The plug 39 includes a radially extending flange 40 received within an annular recess 41 at the lower end 34 of the bladder, whereby the plug is retained in position. The bladder includes an upper circular covering web 42 which overlies the upper surface 43 of the plug. The bladder includes an inwardly extending annular retainer portion 44, which underlaps the under surface 45 of the plug, whereby the plug is retained on the bladder.

The plug includes an upper annular boss 46 which incorporates a downwardly facing shoulder portion 47. The plug may include a second, stepped, downwardly directed shoulder 48. A circular sealing disk 49, having a vertically directed interior aperture 50, is sleeved over the depending shank portion 51 of the plug until the upper surface 52 of the disk abuts the downwardly facing shoulder 47 of the boss 46.

The disk 49 is retained in position by a rigid centering member 53 having a central tapped bore 54 mounted on the exterior threaded portion 55 of the shank 51. The centering member 53 is tightened over the shank 51 until the upper surface 56 thereof abuts the downwardly directed shoulder 48 of the plug, whereby the disk 49 is sandwiched in position. A cotter pin 57 may be inserted through a cross aperture 58 in the plug to prevent unthreading of the centering member 53.

The centering member 53, adjacent its outer periphery, includes an annular beveled portion 59, angled at an inclination which is complemental to the inclination of the valve seat 33. In similar fashion, the radial outermost portion 60 of the disk 49 is beveled at an angle to form, in essence, a continuation of the beveled portion 59 of the centering member.

The upper corner 61 of the centering member is rounded so as to preclude the possibility of cutting edges being presented toward the disk.

As clearly shown, the disk 49 is of greater diameter than the diameter of the centering member 53, whereby the radial outermost portion of the disk projects beyond the limits of the centering member.

The operation of the device will be readily appreciated from the foregoing description.

When the pressure in the chamber defined between the bladder and the gas charging valve assembly 12 exceeds the pressure between the bladder and the liquid chamber, the gas pressure will force the bladder to expand, urging the valve assembly 14 progressively toward the valve seat 33. In the course of the valve assembly approaching the valve seat, the complementally inclined surfaces of the centering member 53 and seat 33 will guide the valve assembly to a central position over the port 15.

When the valve assembly 14 reaches a final or seated position, it will be understood that a partial or complete seal may be effected between the beveled portion 59 of the centering member 53 and the valve seat 33. However, if a particle or particles entrained in the liquid become captured between the opposed rigid surfaces of the centering member and valve seat, a flush engagement and consequent full seal will be prevented.

In accumulator devices heretofore known, the pressure within the air charging compartment would, if the fissure between the valve and seat were sufficiently great, cause bladder components to extrude into such fissure, a condition which, at worst, would involve rupture of the bladder and, at best, produce accelerated wear. In the apparatus of the instant invention, however, the pressure exerted by the bladder will cause the resilient disk 49 to be deflected downwardly into contact with portions of the valve seat 33 surrounding the centering member 53, to effect the desired seal, notwithstanding a degree of tilting of the plug assembly relative to the vertical axis of the accumulator.

Additionally, if by some mischance, e.g. through the presence of a particularly large particle between the disk edge and the valve seat 33, an increment of the bladder should be extruded, it will be appreciated that the extruded portions of the bladder will not engage against the hardened material of the centering member but, rather, will engage the disk which, it will be recalled, is formed of an elastomeric material, albeit stiffer than the material of which the bladder is made.

When pressure within the liquid port exceeds that within the gas chamber, the valve will be unseated in the usual manner.

From the foregoing it will be apparent that there is provided, in accordance with the present invention, an accumulator device having an improved valve assembly, such assembly evidencing particular utility in situations where large capacity-large port units must be employed and where such units are to be used in contact with liquids containing entrained particulate matter. Use of accumulators embodying the construction hereinabove set forth greatly extend the useful life of the bladder.

Having thus described the invention and illustrated its use, what is claimed as new and is desired to be secured by Letters Patent is:

1. A large port pressure accumulator-pulsation dampener device especially adapted for use in the pumping of liquids having entrained abrasive solids, comprising a rigid casing, a gas port at one end of said casing, a fluid port at the other end of said casing, said fluid port being surrounded by a beveled valve seat which is circular in section, a bladder assembly disposed within said casing and dividing the same into a gas and a liquid chamber, said bladder assembly including a stretchable elastomeric bladder having a relatively small opening at one end and a closed end, a gas inlet fitting molded in the small opening in said bladder and extending through said gas port, retainer means for securing said fitting in fixed position in said gas port, a valve assembly carried by the closed end of said bladder and shiftable between sealing and unsealing positions of said liquid port, said valve assembly including a plug member, said plug member having a flanged inner end molded entirely within said closed end of said bladder without communication with the interior of the bladder, a span of bladder material completely overlying the inner end of said plug, said plug member having a shank portion extending axially outward therefrom and from the closed end of the bladder, a rigid valve member releasably mounted on said axially extending shank portion in opposed relation to said valve seat, said valve member being circular in transverse section and complementally beveled with respect to said seat, said valve member including an upper surface portion directed toward said bladder, and a circular sealing disc clamped between said closed end of said bladder and said upper surface of said valve member, said disc being of greater diameter than said upper surface of said valve member and being formed of resilient elastomeric material of higher durometer than the material of said bladder, said disc in the seated position of said valve assembly being deformed into engagement with beveled portions of said valve seat by said bladder.

2. Apparatus in accordance with claim 1 wherein said shank portion includes an outwardly directed shoulder thereabout outward of the closed end of the bladder, for abutment of the valve member thereagainst.

* * * * *